Sept. 14, 1943.　　　S. M. PARKER　　　2,329,441
LANDING GEAR FOR AIRCRAFT
Filed July 21, 1941　　　3 Sheets-Sheet 1
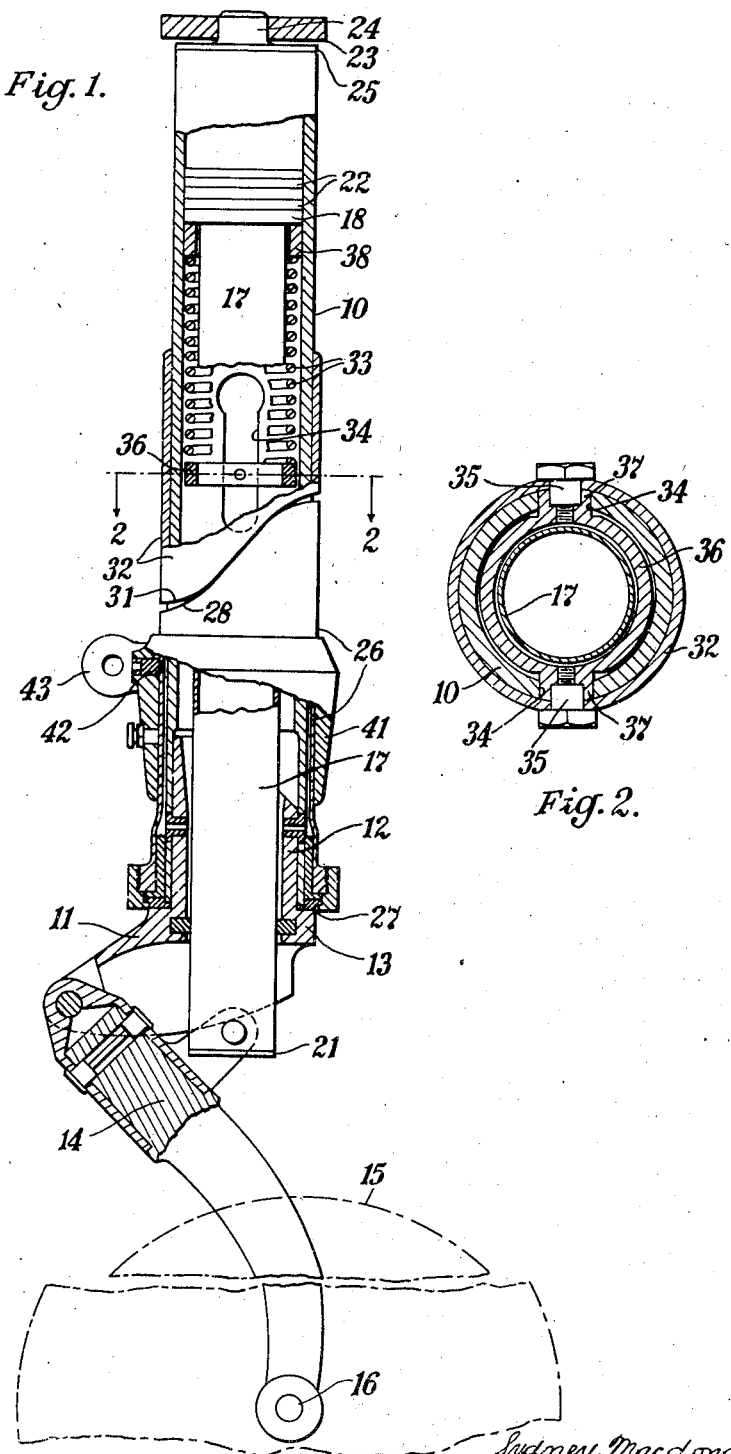

Sept. 14, 1943.    S. M. PARKER    2,329,441
LANDING GEAR FOR AIRCRAFT
Filed July 21, 1941    3 Sheets-Sheet 2

Inventor
Sydney Macdonald Parker.
By Cameron, Kerkam & Sutton.
Attorneys.

Sept. 14, 1943.    S. M. PARKER    2,329,441
LANDING GEAR FOR AIRCRAFT
Filed July 21, 1941    3 Sheets-Sheet 3
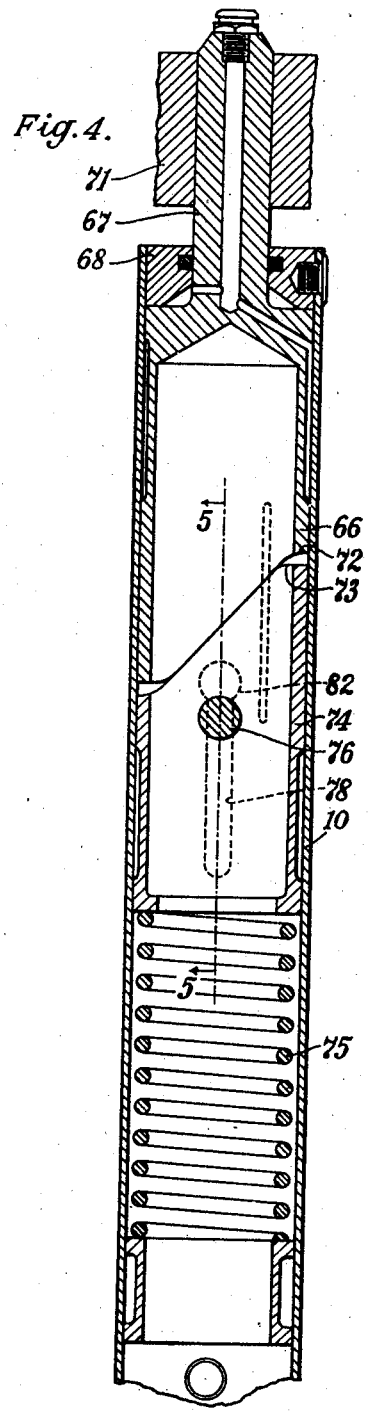
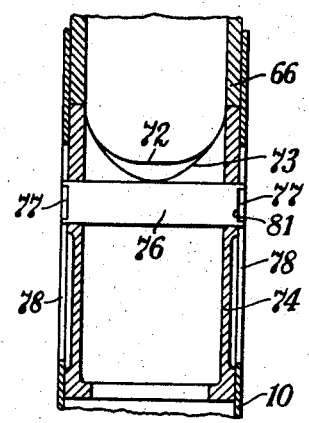

Patented Sept. 14, 1943

2,329,441

UNITED STATES PATENT OFFICE 2,329,441

LANDING GEAR FOR AIRCRAFT

Sydney Macdonald Parker, Leamington Spa, England, assignor to Automotive Products Company Limited, Leamington Spa, England Application July 21, 1941, Serial No. 403,459
In Great Britain June 10, 1940

2 Claims. (Cl. 244—102)

This invention relates to landing gear for aircraft, and comprises a mounting for a wheel or other ground contacting element, the mounting being of the kind incorporating resilient means for absorbing shocks due to the impact of the ground contacting element with the ground, and due to travelling over uneven surfaces, and also permitting the ground contacting element to have a castoring action, which is controlled by self-centering means tending always to return the ground contacting element to a predetermined position, normally in line or parallel with the longitudinal axis of the aircraft.

Such mountings are employed generally for the tail wheels of aircraft, and also for the nose wheels of the so-called "tricycle" type of landing gear now used on some types of aircraft.

The object of the invention is to provide a light and efficient mounting of the kind referred to.

According to the invention, the mounting for a wheel or other ground contacting element comprises a tubular pillar mounted for rotation about a substantially vertical axis in an aircraft, a supporting arm for the ground contacting element pivotally mounted on an offset support carried by the pillar, a shock absorber controlling movement of the arm about its pivot, and a cam and follower self-centering mechanism, one member of which is coupled to the pillar for rotation therewith, whilst the other is restrained against rotation, the second member being integral with or being directly mounted on a bearing supporting the pillar.

According to another aspect of the invention, the mounting comprises a tubular pillar mounted for rotation about a substantially vertical axis in the aircraft, a supporting arm for the ground contacting element pivotally mounted on an offset support carried by the pillar, a shock absorber controlling movement of the arm about its pivot, a cam sleeve mounted in or on the pillar and rotatable therewith, and a cam follower integral with or directly mounted on a bearing member supporting the pillar.

The shock absorber preferably comprises a plunger and cylinder device of which the pillar or a part thereof forms the cylinder, the plunger being attached to the supporting arm and extending into the lower end of the pillar. The plunger may have a head rigidly attached thereto and so formed as to be capable of slight tilting relatively to the pillar, and the peripheral wall of the head may be formed for this purpose with a spherical curvature.

The self-centering mechanism may be mounted inside the pillar, a fixed bearing member for example extending into the pillar and carrying a follower device to engage a cam non-rotatably mounted in the pillar. Alternatively, the pillar may be mounted in an external bearing sleeve having a cam surface formed at one end to engage a corresponding cam surface on a second sleeve slidable but non-rotatable on the pillar.

The invention is hereinafter described with reference to the accompanying drawings, in which—

Figure 1 is an elevation, partly in section, of one form of wheel mounting according to the invention;

Figure 2 is a section on the line 2—2 of Figure 1 drawn to an enlarged scale;

Figure 4 is a partial sectional elevation of an alternative self-centering mechanism for a wheel mounting as shown in Figure 3 but drawn to an enlarged scale; and Figure 5 is a section on the line 5—5 of Figure 4.

Figure 3:
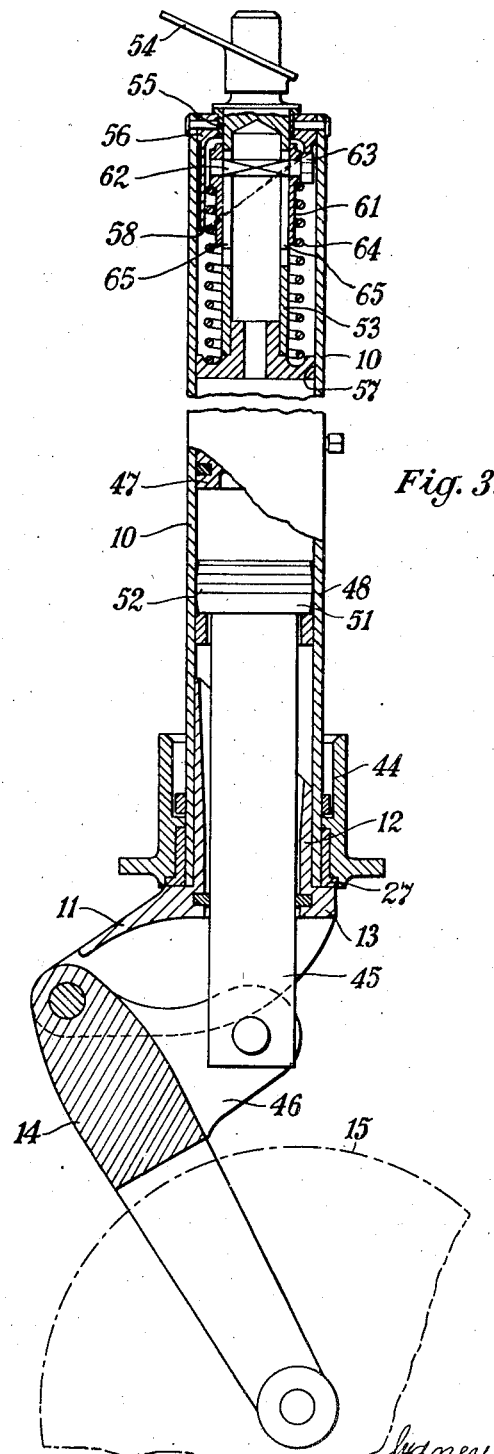
Figure 3 is an elevation, partly in section, of a modified form of wheel mounting according to the invention.

In the form of mounting illustrated in Figure 1, the pillar 10 carries at its lower end a bracket 11 secured thereto by a spigot 12 entering the pillar, and formed with a shoulder 13. At a point on the bracket offset somewhat from the axis of the pillar 10, is pivotally secured one end of a forked arm 14 in which the wheel 15 is mounted, the arm 14 being so arranged that the wheel axis 16 is on the opposite side of the pillar axis to the pivot of the arm. A tubular plunger 17 pivotally secured to the arm 14 near its pivoted end extends into the pillar 10, and is formed at its upper end with an enlarged head 18 fitting closely within the pillar 10, the head 18 having sufficient clearance in the pillar to permit it to rock slightly during the movements of the arm 14 about its pivot. The upper end of the pillar 10 above the plunger head 18 is closed in a fluid-tight manner, and the plunger tube itself is closed at its lower end at 21, these parts together constituting an oleo-pneumatic shock absorber, the air chamber of which is the plunger tube 17, whilst the damping is controlled by orifices (not shown) in the plunger head 18. The air is confined in the plunger tube by a floating piston (not shown) mounted therein. The plunger head is provided with suitable packing means 22 to prevent the escape of the shock absorber liquid into the lower part of the pillar.

The pillar is rotatably mounted in two bearings, one, 23, at its upper end engaging a spigot 24 projecting from the closure plug 25 at the top of the pillar 10, whilst the other comprises a sleeve 26 surrounding the lower end of the pillar, and supporting at its lower end a thrust bearing 27 engaging the flange 13 of the bracket 11. The upper end of the sleeve 26 is formed as a symmetrical cam face 28, and is engaged by a corresponding cam face 31 on a second sleeve 32 slidably but non-rotatably mounted on the exterior of the pillar, and spring urged against the first cam by a spring 33 mounted within the pillar. The pillar 10 is formed with two diametrally opposed longitudinal slots 34, and the second sleeve 32 is secured, by studs 35 passing through these slots, to a ring 36 within the pillar, the ring 36 having square projections 37 extending into the slots to prevent rotation of the sleeve 32 on the pillar, whilst allowing it to move longitudinally. A second ring 38 is secured in the pillar towards the upper end, and between these two rings is mounted the spring 33 tending to urge the cams together, and thereby to return the wheel to a predetermined position. The upper ring 38 also provides a stop for the plunger head 18, to limit the degree of extension of the shock absorber. The sleeve 26 carrying the first cam surface is mounted in an outer sleeve 41 to which it is secured by pins 42. The sleeve 41 is formed with a lug or lugs 43 by means of which it is attached to the aircraft framework. The sleeve 41 is thus non-rotatable about its own axis, though it may be capable of turning about a horizontal axis for retraction of the wheel into the fuselage of the aircraft.

The mounting is fitted in the aircraft with the pivot of the wheel carrying arm 14 forward of the pillar axis, and the wheel axis 16 behind the pillar axis, so that the wheel, when encountering an obstruction, tends to move upwardly and backwardly, compressing the shock absorber, which absorbs the shock and damps the subsequent rebound. Should the wheel strike an obstruction of such height that the main force of the shock is very nearly horizontal, the shock will be transmitted to the shock absorber, which is not the case when the wheel fork is secured directly to the plunger of the shock absorber. The present invention provides a mounting which has this ability to absorb shocks acting in a substantially horizontal direction, and at the same time is as easily mounted as, and is not substantially heavier than, the type of mounting in which the wheel fork is secured directly to the plunger of the shock absorber.

The wheel is able to swing away from the fore-and-aft position to enable the aircraft to turn readily when manoeuvring on the ground, such movement being restrained by the spring loading of the cams 28, 31. The cams tend to return the wheel to, and locate it in, the fore-and-aft position, and so resist any tendency for the wheel to oscillate about that position.

Figure 3 shows another form of wheel mounting according to the invention, in which the self-centering mechanism is associated with the upper bearing of the pillar 10. As in the previous example, a bracket 11 is mounted by means of a spigot 12 in the pillar 10, and is secured thereto for rotation with the pillar, the bracket having a flange 13 resting against a thrust bearing 27 mounted in a sleeve 44 forming also a journal bearing for the lower end of the pillar.

A shock absorber plunger 45 is mounted pivotally between two lugs 46 on the fork 14, and projects into the lower end of the pillar 10. A partition 47 intermediate the ends of the pillar separates the lower part from the upper, the lower part 48 below the partition forming the cylinder of the shock absorber. The plunger 45 is formed with an enlarged head 51 at its upper end fitting closely in the pillar, the head 51 having a slight spherical curvature of its peripheral wall 52 to enable it to tilt in the pillar, and allow for the sideways movement of the lugs 46 as the fork 14 moves about its pivot on the bracket 11. The shock absorber is of the oleo-pneumatic type, having damping orifices in the plunger head 51 to control the flow of liquid from the cylinder to the interior of the plunger, and having its resilient element formed by a body of compressed air confined in the plunger tube by a floating piston.

The self-centering mechanism is contained in the upper part of the pillar, into which there extends a bearing member 53 non-rotatably secured to a bracket 54 in the aircraft framework. The bearing has two bearing surfaces, one, 55, cooperating with a bore through an end plug 56 closing the end of the pillar 10, whilst the other 57, is of larger diameter and engages the wall of the pillar itself, the bearing 57 forming an enlarged head on the stem of the bearing member 53. The closure plug 56 is formed at its inner end with an oblique cam face 58, and a sleeve 61 mounted slidably on the bearing member 53 carries a spindle 62 for a roller 63 acting as a cam follower, the roller 63 being held up against the cam face by a spring 64 taking its abutment on the head 57. The bearing member 53 is slotted as at 65 to permit the sliding movement of the spindle 62 with the sleeve 61.

In this arrangement, angular movement of the wheel fork 14 away from the fore-and-aft position causes turning of the pillar, which carries with it the cam face 58. The roller 63 is thus forced downwardly against the resistance of the spring 64, and this spring provides a self-centering force to return the wheel to the fore-and-aft position.

Figures 4 and 5 show a modified self-centering mechanism for a mounting similar to that shown in Figure 3. The pillar 10 is supported at its upper end by an internal bearing member 66 having a stem 67 projecting through the end closure 68 of the pillar and non-rotatably secured in the aircraft framework 71. The lower end of the bearing member 66 is formed as a cam face 72, to co-operate with a second cam face 73 on a sleeve 74 slidable in the pillar against the load of a spring 75. The sleeve 74 is rotationally coupled to the pillar by a pin 76 passing diametrally across the sleeve and having flats 77 formed at its ends to engage in slots 78 in the pillar. The pin is retained in position by the shoulders 81 engaging the inner surface of the pillar at the edges of the slots. An enlarged aperture 82 is formed at one end of each of the slots, to permit the pin to be fitted into place.

The mounting illustrated in Figure 3 may be made retractable by mounting the sleeve 44 on a horizontal pivot in the aircraft, and providing a movable support for the upper bearing, the said movable support being controlled by a folding strut or like unit to swing the pillar from an extended to a retracted position and vice-versa.

What I claim is:

1. A mounting for a ground contacting element on an aircraft comprising, a tubular pillar, bearing members supporting said pillar for rotation about a substantially vertical axis in the aircraft, said pillar constituting the cylinder of a shock absorber, a support carried by the pillar including a portion offset with respect to the vertical axis of the latter, a supporting arm for the ground contacting element pivotally attached to the offset portion of said support, a plunger pivotally attached to said arm and extending into said pillar, cam and follower self-centering means comprising a sleeve secured against rotation with respect to and surrounding said pillar and having a cam surface, a second sleeve having a cam surface surrounding said pillar and adapted to rotate therewith, both of said sleeves being in camming engagement with each other, and means continuously biasing said self-centering means to centering position.

2. A mounting for a ground contacting element on an aircraft comprising, a tubular pillar having two bearing portions, one of said bearing portions being at the top of said tubular pillar and the other at the bottom of said pillar, said pillar constituting the cylinder of a shock absorber, a support carried by the pillar including a portion offset with respect to said pillar, a supporting arm for the ground contacting element pivotally attached to the offset portion of said support, a plunger pivotally attached to said arm and extending into said pillar, cam and follower self-centering means comprising a sleeve having a diameter greater than the diameter of said tubular pillar and fixed against rotation about a vertical axis with respect to said pillar and having a cam surface, a second sleeve, having a diameter greater than the tubular pillar and adapted to rotate with said pillar and having a cam surface suited to cooperate with said cam surface of said first sleeve, and spring means continuously biasing said cam portions into engagement to normally maintain said self-centering means in centering position.

SYDNEY MACDONALD PARKER.